United States Patent
Weng

(10) Patent No.: US 7,443,148 B2
(45) Date of Patent: Oct. 28, 2008

(54) CONSTANT ON-TIME REGULATOR WITH INCREASED MAXIMUM DUTY CYCLE

(75) Inventor: Matthew Weng, San Ramon, CA (US)

(73) Assignee: Micrel, Inc., San Jose, CA (US)

( * ) Notice: Subject to any disclaimer, the term of this patent is extended or adjusted under 35 U.S.C. 154(b) by 0 days.

(21) Appl. No.: 11/955,157

(22) Filed: Dec. 12, 2007

(65) Prior Publication Data

US 2008/0088284 A1 Apr. 17, 2008

Related U.S. Application Data

(63) Continuation-in-part of application No. 11/530,548, filed on Sep. 11, 2006.

(51) Int. Cl.
*G05F 1/56* (2006.01)
(52) U.S. Cl. ...................... 323/271; 323/288
(58) Field of Classification Search .............. 323/271, 323/282, 283, 288
See application file for complete search history.

(56) References Cited

U.S. PATENT DOCUMENTS

| | | | |
|---|---|---|---|
| 5,747,976 A | | 5/1998 | Wong et al. |
| 6,147,478 A | | 11/2000 | Skelton et al. |
| 6,583,610 B2 | | 6/2003 | Groom et al. |
| 7,202,642 B1 | * | 4/2007 | Chen et al. ............... 323/222 |
| 2007/0222423 A1 | * | 9/2007 | Chen et al. ............... 323/283 |
| 2008/0030181 A1 | * | 2/2008 | Liu et al. .................. 323/283 |
| 2008/0061750 A1 | * | 3/2008 | Stoichita .................. 323/271 |
| 2008/0088284 A1 | * | 4/2008 | Weng ....................... 323/271 |
| 2008/0088292 A1 | * | 4/2008 | Stoichita et al. .......... 323/285 |

OTHER PUBLICATIONS

"LM3100 Simple Switcher® Synchronous 1MHz 1.5A Step-Down Voltage Regulator," National Semiconductor data sheet, Feb. 2006, pp. 1-15.
"LM5007 High Voltage (80V) Step Down Switching Regulator," National Semiconductor data sheet, Dec. 2004, pp. 1-12.
Rais Miftakhutdinov, "Synchronous buck regulator design using the TI TPS5211 high-frequency hysteretic controller," Texas Instruments Incorporated, Analog and Mixed-Signal Products, Nov. 1999, pp. 10-14.

(Continued)

*Primary Examiner*—Jeffrey L Sterrett
(74) *Attorney, Agent, or Firm*—Patent Law Group LLP; Carmen C. Cook

(57) ABSTRACT

A buck switching regulator receives an input voltage and provides a switching output voltage on a switch output node using a minimum on-time, variable off-time feedback control loop. The buck switching regulator includes an on-time control circuit for generating a first signal for turning off the high-side switch at the expiration of a first on-time duration or at the expiration of a maximum on-time. The first on-time duration is at least a minimum on-time and is allowed to expand to a maximum on-time when the feedback voltage remains less than a reference voltage. The maximum on-time includes a first maximum on-time and a second, extended maximum on-time. The second maximum on-time is applied when a minimum off-time was used for the high-side switch during the previous switching cycle. In another embodiment, the second maximum on-time is applied only when the switching regulator is not being current limited.

12 Claims, 7 Drawing Sheets

OTHER PUBLICATIONS

"TPS5211 High Frequency Programmable Hysteretic Regulator Controller," Texas Instruments data sheet, Sep. 1999, downloaded from www.datasheetcatalog.com, pp. 1-31.

"SC470 Synchronous Buck Controller for Dynamic Load-Voltage Applications," Semtech data sheet, Sep. 27, 2005, www.semtech.com, pp. 1-31.

MAX1710/MAX1711/MAx1712 Data Sheet, "High-Speed, Digitally Adjusted Step-Down Controllers for Notebook CPUs," Maxim Integrated Products data sheet, 2000, pp. 1-28.

"Analysis and Design of a Hysteretic Constant Frequency Buck Regulator Using the LM5007," National Semiconductor Corporation Application Note 1319, May 2004, pp. 1-18.

Ioan Stoichita, "Ripple Generation In Buck Regulator Using Fixed On-Time Control To Enable The Use of Output Capacitor Having Any ESR," U.S. Appl. No. 11/530,548, filed Sep. 11, 2006, 25 pages, parent application not yet published.

* cited by examiner

CONSTANT ON-TIME REGULATOR WITH INCREASED MAXIMUM DUTY CYCLE

CROSS-REFERENCE TO RELATED APPLICATIONS

This application is a continuation-in-part of application Ser. No. 11/530,548, filed Sep. 11, 2006, entitled "Ripple Generation In Buck Regulator Using Fixed On-Time Control To Enable The Use of Output Capacitor Having Any ESR" having at least one common inventor hereof, which application is incorporated herein by reference in its entirety.

This application is related to concurrently filed and commonly assigned U.S. patent application Ser. No. 11/955,150, entitled "Constant On-Time Regulator With Internal Ripple Generation and Improved Output Voltage Accuracy," of Ioan Stoichita, Matthew Weng and Charles Vinn, which application is incorporated herein by reference in its entirety.

FIELD OF THE INVENTION

The invention relates to switching regulators or DC-to-DC converters and, in particular, to a control scheme incorporated in a constant on-time buck regulator with multi-mode on and off time control.

DESCRIPTION OF THE RELATED ART

DC voltage regulators or switching regulators operate to convert energy from one DC voltage level to another DC voltage level. These types of switching regulators are also referred to as DC/DC converters. A switching regulator, sometimes referred to as a switching mode power supply, provides power supply function through low loss components such as capacitors, inductors, and transformers, and power switches that are turned on and off to transfer energy from the input to the output in discrete packets. A feedback control circuit is used to regulate the energy transfer to maintain a constant output voltage within the desired load limits of the circuit.

A switching regulator can be configured to step up the input voltage or step down the input voltage or both. Specifically, a buck switching regulator, also called a "buck converter," steps down the input voltage while a boost switching regulator, also called a "boost converter," steps up the input voltage. A buck-boost switching regulator, or buck-boost converter, provides both step-up and step-down functions.

The operation of the switching regulator is well known and is generalized as follows. A power switch is turned on to apply energy to an inductor of the output filter circuit to allow the current through the inductor to build up. When the power switch is turned off, the voltage across the inductor reverses and charges are transferred onto an output capacitor of the output filter circuit and the load. A relatively constant output voltage is maintained by the output capacitor. A second power switch is sometimes used for synchronous control operation.

A switching regulator can be constructed using integrated (internal) power switches or external power switches. When the power switches are external to the switching regulator integrated circuit (IC), the switching regulator IC is sometimes referred to as a "switching regulator controller" or a converter controller to indicate that the switching regulator controller provides the control signals for driving the external power switches which are in turn coupled to the output filter circuit to generate the relatively constant output voltage. A switching regulator controller is also referred to as a buck controller, a boost controller, or a buck-boost controller depending on the voltage conversion function of the controller.

Buck switching regulators or "buck regulators" with fixed on-time control are preferred in the industry for some important advantages as good efficiency for light load in PFM (pulse width modulation) mode, easy synchronization with external signals, easy control of a relatively large off-time and a very small fixed on-time to regulate a high input voltage to a low output voltage.

Fixed on-time (or constant on-time) regulators are one type of voltage regulators employing ripple-mode control while hysteretic regulators are another type of switching regulators also employing ripple-mode control. In general, ripple-mode regulators regulate their output voltage based on the ripple component in the output signal. Because of the switching action at the power switches, all switch-mode regulators generate an output ripple current through the switched output inductor. This current ripple manifests itself as an output voltage ripple due, principally, to the equivalent series resistance (ESR) in the output capacitors placed in parallel with the load.

A hysteretic regulator uses a comparator to compare the output voltage being regulated, including ripple, to a hysteresis control band. Above an upper hysteresis limit, the hysteretic controller switches its associated output inductor low, and below a lower hysteresis limit the hysteretic controller switches the output inductor high. On the other hand, a fixed on-time regulator, while operating similar to hysteretic controllers, switches the output inductor high for a fixed time when the output ripple falls below a single reference point. At the end of the fixed on-time, even if the output ripple is still below the single reference point, the output inductor is switched low for a minimum off-time before getting switched back high for the fixed on-time again.

For voltage regulators using ripple-mode control, while the output ripple is useful in output voltage regulation, it is undesirable in terms of output signal noise and load voltage limits. Indeed, the desire to minimize output ripple has lead to design and production of capacitors having very low ESR. Lowering output capacitor ESR can significantly lower the output ripple signal. Low ripple serves the interests of noise minimization and reduced load voltage variation, but makes ripple-mode regulation more difficult. Low ripple magnitude reduces the comparator voltage differentials, making accurate and fast comparison very difficult.

To that end, manufacturers of fixed on-time voltage regulators impose a minimum ESR for the output capacitor to ensure a minimum amount of ripple voltage at the output voltage so that effective ripple-mode control can be realized. Thus, an output capacitor with a large ESR has to be used with all fixed on-time voltage regulators. In some cases, when the output capacitor itself does not have enough ESR, manufacturers suggest including a resistor in series with the output capacitor to introduce enough series resistance to generate the required minimum amount of ripple voltage.

One solution to the requirement of a high ESR output capacitor is adding a current feedback in the control loop. In another case, a virtual ripple generator is used to generate an internal virtual ripple proportional with inductor current. While these solutions allow for the use of low ESR capacitors in ripple-mode voltage regulators, these solutions add complexity and cost to the voltage regulators.

The requirement of a minimum amount of ripple voltage at the output signal limits the application of fixed on-time voltage regulators to cases where ripples in the output voltage can be tolerated. Also, zero ESR capacitors, such as ceramic capacitors, which are usually cheaper than tantalum capacitors having large ESR, cannot be used because a minimum amount of ESR is required for proper control loop operation.

SUMMARY OF THE INVENTION

According to one embodiment of the present invention, a buck switching regulator is formed on an integrated circuit and receives an input voltage where the buck switching regulator controls a high-side switch and a low-side switch using a feedback control loop to drive a switch output node for generating a switching output voltage. The switch output node is coupled to an LC filter circuit external to the integrated circuit to generate a regulated output voltage having a substantially constant magnitude on an output node. The regulated output voltage is fed back to the buck switching regulator to a voltage divider for generating a feedback voltage on a feedback voltage node. The buck switching regulator includes an on-time control circuit for generating a first signal for controlling the high-side switch under a minimum on-time and variable off-time feedback control loop where the first signal turns off the high-side switch at the expiration of a first on-time duration or at the expiration of a maximum on-time. The first on-time duration is at least a minimum on-time and can be expanded up to a maximum on-time when the feedback voltage remains less than the reference voltage. The maximum on-time can be a first maximum on-time and a second, extended maximum on-time greater than the first maximum on-time. The second, extended maximum on-time is applied when a minimum off-time was used for the high-side switch during the previous switching cycle.

According to another aspect of the present invention, a method in buck switching regulator receiving an input voltage and controlling a first switch and a second switch using a feedback control loop to drive a switch output node for generating a switching output voltage, where the switch output node is coupled to an LC filter circuit to generate a regulated output voltage having a substantially constant magnitude on an output node and the regulated output voltage is fed back to the buck switching regulator to a voltage divider for generating a feedback voltage on a feedback voltage node, includes providing a first on-time duration for the high-side switch where the first on-time duration is at least a minimum on-time and can be expanded up to a maximum on-time when the feedback voltage remains less than the reference voltage and the maximum on-time can be a first maximum on-time and a second, extended maximum on-time greater than the first maximum on-time, applying the second, extended maximum on-time when a minimum off-time was used for the high-side switch during the previous switching cycle, and generating a first signal for turning off the high-side switch under a minimum on-time and variable off-time feedback control loop. The first signal turns off the high-side switch at the expiration of the first on-time duration or at the expiration of the first or second maximum on-times.

The present invention is better understood upon consideration of the detailed description below and the accompanying drawings.

DETAILED DESCRIPTION OF THE PREFERRED EMBODIMENTS

Figure 1:
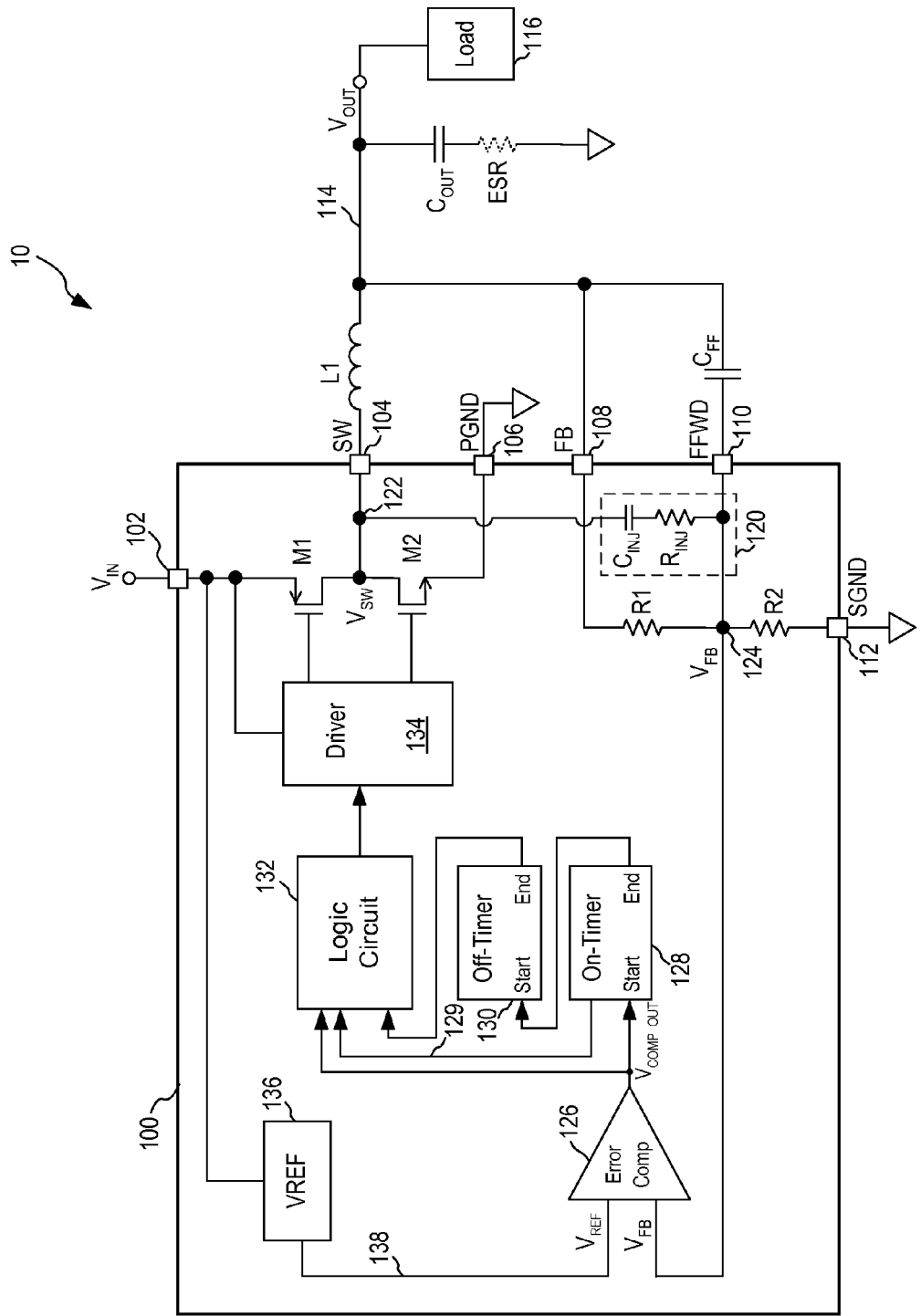
FIG. 1 is a schematic diagram of a fixed (constant) on-time voltage regulator incorporating the ripple injection control scheme according to one embodiment of the present invention.

In accordance with the principles of the present invention, a buck switching regulator using a fixed on-time (or constant on-time) and minimum off-time control loop incorporates a ripple injection circuit for internally generating the necessary ripple using the switching output voltage and injecting the ripple voltage signal into the feedback control loop of the voltage regulator. The amount of ripple to be generated is adjusted by a feedforward capacitor which can be integrated onto the buck regulator or be externally coupled to the buck regulator. In this manner, the buck regulator can be configured to work with an output capacitor having any equivalent series resistors (ESR) values. In particular, when the output capacitor coupled to the buck regulator has a large ESR, the feedforward capacitor is used to program the ripple injection circuit to generate little or no ripple from the switching output voltage. However, when the output capacitor coupled to the buck regulator has zero or very little ESR, the feedforward capacitor is used to program the ripple injection circuit to generate the necessary ripple from the switching output voltage.

The buck switching regulator incorporating a ripple injection circuit provides many advantages over the conventional solutions. First, the buck switching regulator of the present invention enables the use of output capacitors having any ESR values. Thus, it is possible to use an output capacitor of zero or low ESR values, such as ceramic capacitors, to obtain an output voltage with very low output ripple. Meanwhile, the ripple injection circuit generates the necessary ripple internally using the switching output voltage so that the generated ripple voltage does not impact the output voltage whatsoever.

According to one aspect of the present invention, the ripple injection circuit includes a first capacitor and a first resistor connected in series between the switching output voltage and the feedback voltage and also includes a feedforward capacitor connected between the output voltage and the feedback voltage. In one embodiment, the first capacitor and the first resistor are integrated together with the resistor dividers of the feedback voltage onto the same integrated circuit of the buck switching regulator while the feedforward capacitor is formed external to the switching regulator integrated circuit. In another embodiment, the feedforward capacitor is also integrated on the switching regulator integrated circuit. When integrated on-chip, the feedforward capacitor can be formed as a capacitor with programmable capacitance so that the desired capacitance is selected to adjust the desired amount of ripple that is to be generated.

According to another aspect of the present invention, a buck switching regulator using a constant on-time and variable off-time control loop incorporates a ripple injection circuit with improved accuracy where the ripple injection circuit injects the ripple voltage signal into a point in the feedback control loop of the voltage regulator apart from the feedback voltage node. In this manner, errors in the output voltage are reduced and the accuracy of the output voltage is greatly improved. In one embodiment, the ripple injection circuit includes a gain stage receiving the feedback voltage and the ripple voltage signal is injected at the output node of the gain stage. By using a gain stage to amplify the feedback voltage and injecting the ripple voltage signal at a point bypassing the gain stage, voltage errors introduced into the regulated output voltage can be reduced significantly.

In one embodiment, the ripple injection circuit includes a gain stage implemented as an operational transconductance amplifier (OTA) receiving the feedback voltage and a first reference voltage. The ripple injection circuit further includes a first capacitor and a first resistor connected in series between the switching output voltage and the output terminal of the OTA. Finally, the ripple injection circuit includes a feedforward capacitor connected between the output voltage and the output terminal of the OTA. The ripple injection circuit with improved accuracy will be described in more detail below.

FIG. 1 is a schematic diagram of a fixed on-time, minimum off-time buck switching regulator incorporating the ripple injection circuit according to one embodiment of the present invention. Referring to FIG. 1, a buck switching regulator system 10 includes a buck switching regulator 100 ("buck regulator 100") coupled to an output LC filter circuit. Buck regulator 100 receives an input voltage $V_{IN}$ and provides a switching output voltage $V_{SW}$ (terminal 104) to the output LC filter circuit formed by an inductor L1 and an output capacitor $C_{OUT}$. The output LC filter circuit generates a DC output voltage $V_{OUT}$ at an output voltage node 114 having substantially constant magnitude. In actual implementation, the output voltage $V_{OUT}$ is coupled to drive a load 116, as shown in FIG. 1. The output capacitor $C_{OUT}$ has associated with it a certain amount of ESR, as represented by the dotted-line resistor ESR connected in series with the output capacitor. When an output capacitor with zero ESR is used, resistor ESR has zero resistance and is therefore a short circuit.

Buck regulator 100 implements a fixed on-time, variable off-time feedback control loop. In the present description, fixed on-time is also referred to as "constant on-time". In the following description, the fixed on-time feedback control loop of buck regulator 100 will be described first, followed by the description of the ripple injection circuit for injecting the desired amount of ripple to the feedback control loop.

Referring to FIG. 1, buck regulator 100 receives an input voltage $V_{IN}$ on a terminal 102. A pair of power switches M1 and M2 is connected in series between the input voltage $V_{IN}$ (terminal 102) and a ground voltage at a PGND terminal 106. In the present configuration, buck regulator 100 includes separate ground connections, PGND and SGND, for the power switches and the rest of the circuitry for noise isolation purposes. The use of separate ground connections for noise isolation is well known in the art and is not critical to the practice of the present invention. In the present embodiment, power switch M1 is a PMOS transistor and power switch M2 is an NMOS transistor and are controlled by drive signals generated by a driver 134. A switching output voltage $V_{SW}$ is generated at the common node 122 between power switches M1 and M2. The switching output voltage $V_{SW}$ is coupled through a SW terminal 104 to an inductor-capacitor (LC) filter network including inductor L1 and output capacitor $C_{OUT}$ for filtering the switching output voltage $V_{SW}$ and generating the DC output voltage $V_{OUT}$ at the output voltage node 114 having a substantially constant magnitude. In actual implementation, the DC output voltage $V_{OUT}$ is used to drive load 116.

The DC output voltage $V_{OUT}$ is coupled back to buck regulator 100 to form a feedback control loop for regulating the switching output voltage $V_{SW}$. Specifically, output voltage $V_{OUT}$ is coupled through a FB terminal 108 to a voltage divider formed by resistors R1 and R2. A feedback voltage $V_{FB}$ (node 124), being a stepped down version of the output voltage $V_{OUT}$, is coupled to a first input terminal (the negative input terminal) of an error comparator 126. A reference voltage $V_{REF}$ (node 138) is coupled to a second input terminal (the positive input terminal) of error comparator 126. Reference voltage $V_{REF}$ is generated by a voltage reference circuit 136 powered by the input voltage $V_{IN}$. The voltage reference circuit 136 is well known and many circuit configurations are possible for receiving the input voltage $V_{IN}$ and generating a reference voltage $V_{REF}$ having the desired voltage magnitude.

Error comparator 126 evaluates the difference between the feedback voltage $V_{FB}$ and the reference voltage $V_{REF}$ and provides an output voltage signal $V_{COMP\_OUT}$ indicative of the difference between the feedback voltage $V_{FB}$ and the reference voltage $V_{REF}$. To form the fixed on-time control loop, the output voltage signal $V_{COMP\_OUT}$ is coupled to the Start input terminal of an On-Timer 128 and also to a logic circuit 132. On-Timer 128 provides a predetermined on-time duration when the Start signal is asserted and provides an End output signal indicating the end of the predetermined on-time duration. When the feedback voltage $V_{FB}$ falls below the reference voltage $V_{REF}$, the output voltage signal $V_{COMP\_OUT}$ is asserted and the on-time duration programmed in On-Timer 128 is initiated. When the on-time duration is initiated, On-Timer 128 also provides a control signal on a bus 129 to logic circuit 132 to instruct logic circuit 132 to turn on the high-side switch M1. The current through inductor L1 is thus allowed to build up. High-side switch M1 is turned on only for a fixed duration. When the on-time duration expires, On-Timer 128 instructs logic circuit 132 to turn off the high-side switch M1 and turn on low-side transistor M2.

To implement the variable off-time control, the End output signal from On-Timer 128 is coupled to the Start input terminal of an Off-Timer 130. Thus, when the on-time duration expires, the off-time duration programmed in Off-Timer 130 is initiated. Off-Timer 130 provides an End output signal to logic circuit 132 to indicate the end of the off-time duration, at which time the power transistor M1 can be turned back on if the feedback voltage $V_{FB}$ is less than the reference voltage $V_{REF}$. In this manner, a minimum off-time is implemented in the feedback control loop.

Through the operation of error comparator 126, On-timer 128, and Off-Timer 130, logic circuit 132 generates control signals to driver 134 to cause power switches M1 and M2 to be turned on and off alternately to generate the switching output voltage $V_{SW}$. In the present embodiment, the feedback control loop is established so that the on-time of buck switching regulator 100 is adaptable to different input voltages and different output voltages with the goal to keep the operating frequency constant.

Figure 2:
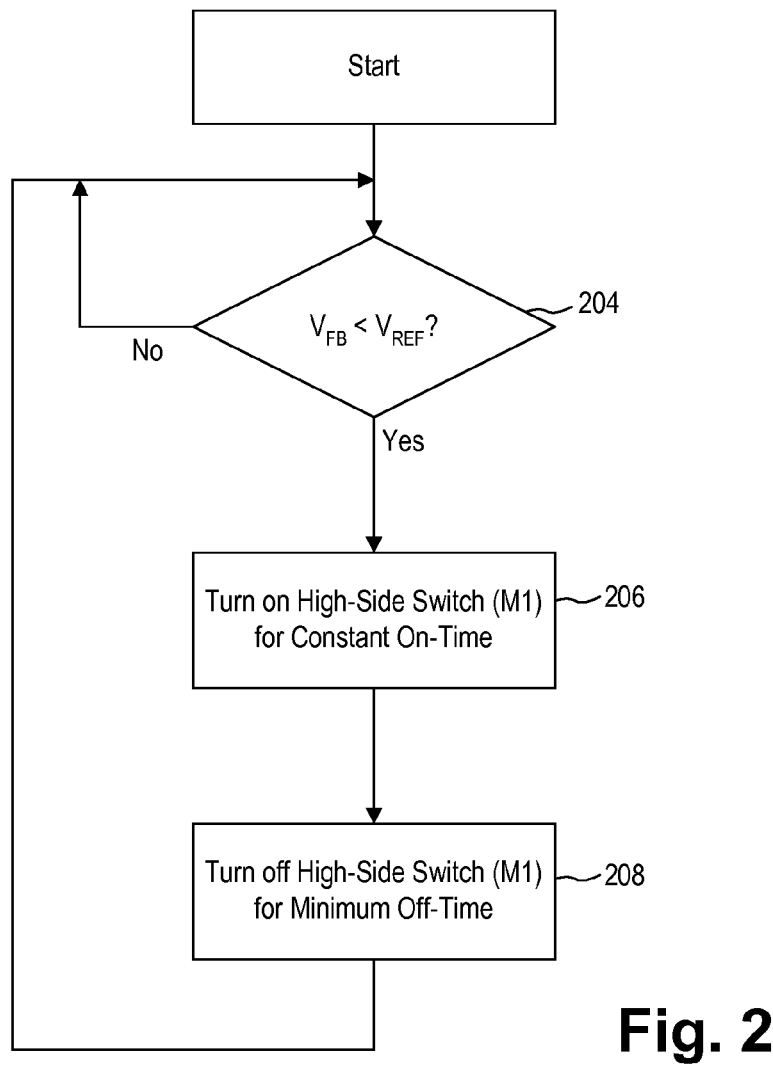
FIG. 2 illustrates the constant on-time and minimum off-time control loop employed by the voltage regulator of FIG. 1.

FIG. 2 is a flow chart illustrating the constant on-time and minimum off-time feedback control loop operation implemented in buck switching regulator system 10 of FIG. 1. Referring to FIG. 2, at the start of the feedback control loop, the feedback voltage $V_{FB}$ is compared against the reference voltage $V_{REF}$ (step 204). If the feedback voltage $V_{FB}$ is less than the reference voltage $V_{REF}$, then the control loop turns on the high-side switch M1 (and turns off the low-side switch M2) for a fixed amount of on-time (step 206). Following the fixed on-time, the high-side switch M1 is turned off (and the low-side switch M2 turned on) for a minimum amount of off-time (step 208). The control loop then returns to the comparison step 204. If the feedback voltage $V_{FB}$ is greater than or equal to the reference voltage $V_{REF}$, then no action is taken and the high-side switch M1 remains turned off while the low-side switch M2 remains turned on. However, if the feedback voltage $V_{FB}$ is still less than the reference voltage $V_{REF}$, the high-side switch M1 is turned on again for a fixed on-time (step 206). The control loop continuously operates to keep the feedback voltage $V_{FB}$ at or above the reference voltage $V_{REF}$.

As illustrated by the flow chart of FIG. 2, the buck switching regulator system 10 of FIG. 1 will adjust the off-time by increasing the off-time from a minimum off-time (min-toff) to a nominal off-time when the feedback voltage $V_{FB}$ is equal to or greater than the reference voltage $V_{REF}$. In the case of continuous current mode, the operating frequency of the buck regulator will be stable and the duty cycle is given as:

$$D = \frac{Vout}{Vin} = \frac{ConstTon}{ConstTon + Contr.Toff} \qquad \text{Eq. (1)}$$

where ConstTon is the constant on-time and Contr.Toff is the off-time. If the constant on-time is defined as:

$$ConstTon \sim \frac{1}{Vin} \qquad \text{Eq. (2)}$$

The frequency of switching output voltage is then constant as a function of $V_{IN}$. Constant frequency of the switching output voltage is desirable in some applications.

Returning to FIG. 1, buck switching regulator 100 includes a ripple injection circuit 120 working in conjunction with a feedforward capacitor $C_{FF}$ for generating a given amount of ripple from the switching output voltage and injecting the ripple voltage signal into the feedback control loop of the buck switching regulator system 10. By including the ripple injection circuit and the feedforward capacitor $C_{FF}$, buck regulator 100 of the present invention can be coupled to an output capacitor $C_{OUT}$ having any value of ESR. That is, a zero-ESR capacitor, such as a ceramic capacitor, can be used as the output capacitor $C_{OUT}$ so that the ripple voltage at the output voltage $V_{OUT}$ is minimized. Meanwhile, the ripple injection circuit and the feedforward capacitor of the present invention operate to provide the necessary ripple for the feedback control loop. On the other hand, if a capacitor with a large ESR is used, the ripple injection circuit of the present invention can be deactivated by the feedforward capacitor as no ripple generation is necessary.

Ripple injection circuit 120 includes a first capacitor $C_{INJ}$ and a resistor $R_{INJ}$ connected in series between the switching output voltage $V_{SW}$ (node 122) and the feedback voltage $V_{FB}$ (node 124). In the present embodiment, first capacitor $C_{INJ}$ has one terminal connected to the switching output voltage node SW and the other terminal connected to resistor $R_{INJ}$ and resistor $R_{INJ}$ is connected between capacitor $C_{INJ}$ and the feedback voltage $V_{FB}$ (node 124). In other embodiments, the order of capacitor $C_{INJ}$ and resistor $R_{INJ}$ can be reversed. The ripple injection circuit 120 works in conjunction with the voltage divider of resistors R1 and R2 to generate the feedback voltage $V_{FB}$ having the desired voltage level and the desired amount of ripple. In accordance with the present invention, the ripple injection circuit 120 is coupled to the switching output voltage node 122 so that the ripple voltage signal is generated from the switching output voltage $V_{SW}$. In other words, the ripple voltage signal is a divided-down signal of the switching output voltage $V_{SW}$ and is at the switching frequency of the switching output voltage. The amount of ripple signal generated at the feedback voltage $V_{FB}$ node 124, if any, is determined by the capacitance value of the feedforward capacitor $C_{FF}$. Feedforward capacitor $C_{FF}$ is connected between the output voltage $V_{OUT}$ (node 114) and a feedforward FFWD terminal 110 of buck regulator 100. The feedforward FFWD terminal 110 is connected directly to the feedback voltage $V_{FB}$ node 124. Thus, feedforward capacitor $C_{FF}$ is connected between the output voltage $V_{OUT}$ and the feedback voltage $V_{FB}$.

The ripple voltage signal is divided by capacitor $C_{INJ}$ and the feedforward capacitor $C_{FF}$. When the switching output voltage $V_{SW}$ is applied to capacitor $C_{INJ}$, capacitor $C_{INJ}$ acts as a differentiator. If the switching output voltage $V_{SW}$ switches sufficiently rapidly, then capacitor $C_{INJ}$ acts as a short circuit. In this manner, the switching output voltage $V_{SW}$ is divided down to generate the ripple voltage signal. In one embodiment, the ripple voltage has a peak-to-peak magnitude of approximately 20 mV.

Feedforward capacitor $C_{FF}$ is coupled in parallel with resistors R1 and R2 and acts as a capacitive divider with capacitor $C_{INJ}$. Thus, the peak-to-peak voltage of the ripple voltage signal is made a function of the capacitance value of the feedforward capacitor $C_{FF}$. Accordingly, the capacitance value of feedforward capacitor $C_{FF}$ is used to program the ripple injection circuit to allow buck regulator 100 to work with output capacitor $C_{OUT}$ having any ESR values.

More specifically, feedforward capacitor $C_{FF}$ is AC coupled between the output voltage $V_{OUT}$ and the feedback voltage $V_{FB}$. If the capacitance of capacitor $C_{FF}$ is very large, then capacitor $C_{FF}$ is a short circuit to the AC signals that may appear at the output voltage $V_{OUT}$ node 114. As such, the ripple injection circuit is shorted out by the large feedforward capacitor $C_{FF}$ and no ripple signal generated by the ripple injection circuit is injected to the feedback voltage $V_{FB}$ node. Instead, the output voltage $V_{OUT}$, with the ripple voltage component, is coupled to the voltage divider of the feedback control loop through FB terminal 108. The feedback voltage $V_{FB}$ is thus generated from an output voltage signal $V_{OUT}$ having the necessary ripple.

On the other hand, if the capacitance of capacitor $C_{FF}$ is very small or is zero, then capacitor $C_{FF}$ is an open circuit to the AC signals that may appear on the output voltage $V_{OUT}$ node 114. In this case, the ripple signal generated by the ripple injection circuit of capacitor $C_{INJ}$ and $R_{INJ}$ passes to the feedback voltage $V_{FB}$ node 124 and the maximum amount of ripple is provided to the feedback control loop.

Thus, in actual implementation, when an output capacitor $C_{OUT}$ with sufficiently large ESR is used, there is no need for ripple injection circuit 120 to generate any ripple voltage signal for the feedback control loop. When no ripple voltage signal from the ripple injection circuit is desired, a feedforward capacitor $C_{FF}$ having a large capacitance value is used where the large feedforward capacitor $C_{FF}$ essentially shorts out the effect of capacitor $C_{INJ}$ of the ripple injection circuit and the ripple signal generated by the ripple injection circuit is canceled out by the feedforward capacitor $C_{FF}$.

On the other hand, when an output capacitor $C_{OUT}$ with a small or zero ESR is used, the ripple injection circuit 120 is relied upon to provide the necessary ripple voltage signal for the feedback control loop. Thus, a feedforward capacitor $C_{FF}$ having a small capacitance value is used to allow the ripple signal generated by the ripple injection circuit 120 from the switching output voltage $V_{SW}$ to be passed to the feedback voltage node 124.

The feedforward capacitor $C_{FF}$ thus operates to adjust the amount of ripple voltage that is to be provided by the ripple injection circuit 120. In one embodiment, the feedforward capacitor $C_{FF}$ has a capacitance value in the range of 220 pF to 2.2 nF. The buck regulator 100 can thus work with output capacitor having any ESR value simply by selecting the corresponding capacitance value for the feedforward capacitor. The feedforward capacitor, besides being used as a capacitive divider with the ripple injection circuit, also serves to improve the stability of the transient response by providing a zero to the feedback control loop.

Furthermore, because the ripple voltage signal generated by the ripple injection circuit is an AC version of the switching output voltage $V_{SW}$ coupled to drive the inductor L1, the ripple voltage signal is directly proportional to the input voltage Vin. From control loop stability standpoint, it is good to have a big ripple but from accuracy (load regulation, output voltage ripple) standpoint, the ripple should be minimized to have a minimum impact when input voltage is varying.

In the present embodiment, the feedforward capacitor $C_{FF}$ is formed external to the integrated circuit of the buck regulator 100 to allow different capacitance values of the feedforward capacitor to be used to coordinate with the ESR characteristics of the output capacitor $C_{OUT}$. The amount of injected ripple voltage can thus be fine-tuned by the feedforward capacitance $C_{FF}$. However, in other embodiments, the ripple injection circuit and the feedforward capacitor $C_{FF}$ can both be integrated onto the buck regulator integrated circuit to reduce the number of external components in the buck switching regulator system 10. When integrated, the feedforward capacitor $C_{FF}$ can have a capacitance value suitable for a given range of ESR values of the output capacitor.

The buck regulator incorporating the ripple injection circuit and the feedforward capacitor of the present invention realizes many advantages over the conventional solutions. For instance, one prior art solution generates the ripple voltage from the output voltage $V_{OUT}$ by amplifying the remaining small amount of ripple voltage. When the ripple signal is indeed very small, it is very difficult to replicate the ripple and very difficult to differentiate the ripple signal from noise signals. To the contrary, the ripple injection circuit of the present invention generates the ripple signal from the switching output voltage. Thus, simple circuitry can be used to divide-down the switching output voltage and the ripple signal can be generated free of noise.

Improved Output Voltage Accuracy

In the buck regulator 100 of FIG. 1, the DC output voltage $V_{OUT}$ is a voltage having substantially constant magnitude and without substantial voltage ripples. The ripple voltage signal from the ripple injection circuit 120 is injected at the feedback voltage $V_{FB}$ node 124. The control loop formed by the ripple injection circuit has low gain and thus has limited accuracy. In operation, the average DC voltage (the midpoint) of the ripple voltage signal should equal to the comparator reference voltage $V_{REF}$. However, when the ripple voltage is injected into the feedback voltage $V_{FB}$, the average DC voltage of the ripple signal is offset from the reference voltage $V_{REF}$ due to various factors, such as the delay time to turn on the high-side switch. As a result, output voltage $V_{OUT}$ has a DC offset voltage component which affects the accuracy of the buck regulator.

Figure 3:
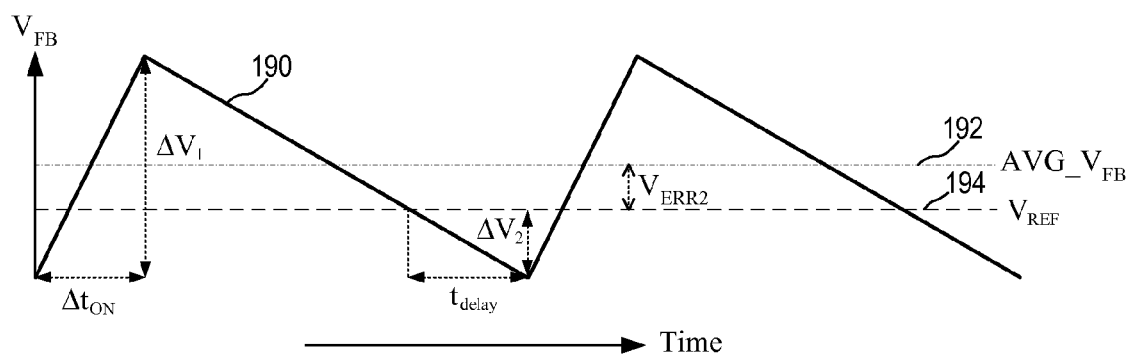
FIG. 3 is a voltage waveform illustrating the feedback voltage $V_{FB}$ of the constant on-time voltage regulator of FIG. 1.

FIG. 3 is a voltage waveform illustrating the feedback voltage $V_{FB}$ of the constant on-time voltage regulator of FIG. 1. Referring to FIG. 3, waveform 190 is the feedback voltage $V_{FB}$ with the injected ripple. The waveform illustration in FIG. 3 assumes that the "on" resistance of the power switches is zero. At time zero, high-side switch M1 is on for the constant on-time $t_{ON}$. The peak-to-peak ripple $\Delta V_1$ is given as:

$$\Delta V_1 = \frac{(V_{IN} - V_{OUT})}{(R_{INJ} * C_{INJ})} * t_{ON}. \qquad \text{Eq. (3)}$$

After the constant on-time, the high-side switch is turned off and the feedback voltage $V_{FB}$ decreases. When the feedback voltage $V_{FB}$ drops to reference voltage $V_{REF}$ (line 194), the high-side switch M1 will turn on again after a propagation delay $t_{delay}$. The amount of voltage $\Delta V_2$ by which feedback voltage $V_{FB}$ drops below reference voltage $V_{REF}$ is given as:

$$\Delta V_2 = \frac{V_{OUT}}{(R_{INJ} * C_{INJ})} * t_{DELAY}. \qquad \text{Eq. (4)}$$

Because of the delay time in turning on the high-side switch, the average feedback voltage AVG_$V_{FB}$ (line 192) is offset from the reference voltage $V_{REF}$ (line 194). The difference between the average feedback voltage AVG_$V_{FB}$ and the reference voltage $V_{REF}$ is an error voltage $V_{ERR2}$, where $V_{ERR2}$ is given as: $\frac{1}{2}\Delta V_1 - \Delta V_2$. The voltage error $V_{ERR2}$ is multiplied by the feedback divider ratio to calculate error in the output voltage $V_{OUT}$. Thus, the residual DC voltage error that appears on the output voltage $V_{OUT}$ will be $(V_{OUT}/V_{REF})$ times as large as the error that appears at the feedback terminal in the form of voltage error $V_{ERR2}$. As a result, output voltage $V_{OUT}$ incorporates the magnified voltage errors and becomes inaccurate. For example, if error voltage $V_{ERR2}$ is 10 mV, the output voltage $V_{OUT}$ is 1.8V, and the reference voltage $V_{REF}$ is 0.9V, the DC residual voltage error seen at the output voltage becomes 10 mV(1.8/0.9)=20 mV, resulting in an offset of 20 mV at the output voltage $V_{OUT}$.

In addition, the fact that the time values $t_{ON}$ and $t_{delay}$ are independent parameters cause inaccuracy in the DC output voltage $V_{OUT}$. In addition, voltages $\Delta V_1$ and $\Delta V_2$ change with the input voltage $V_{IN}$ and output voltage $V_{OUT}$, thereby degrading line regulation. Finally, in actual implementation, the "on" resistance is not zero. Therefore, the output voltage $V_{OUT}$ will vary with the load. These factors contribute to inaccuracies in the regulated output voltage $V_{OUT}$ which are undesirable.

Figure 4:
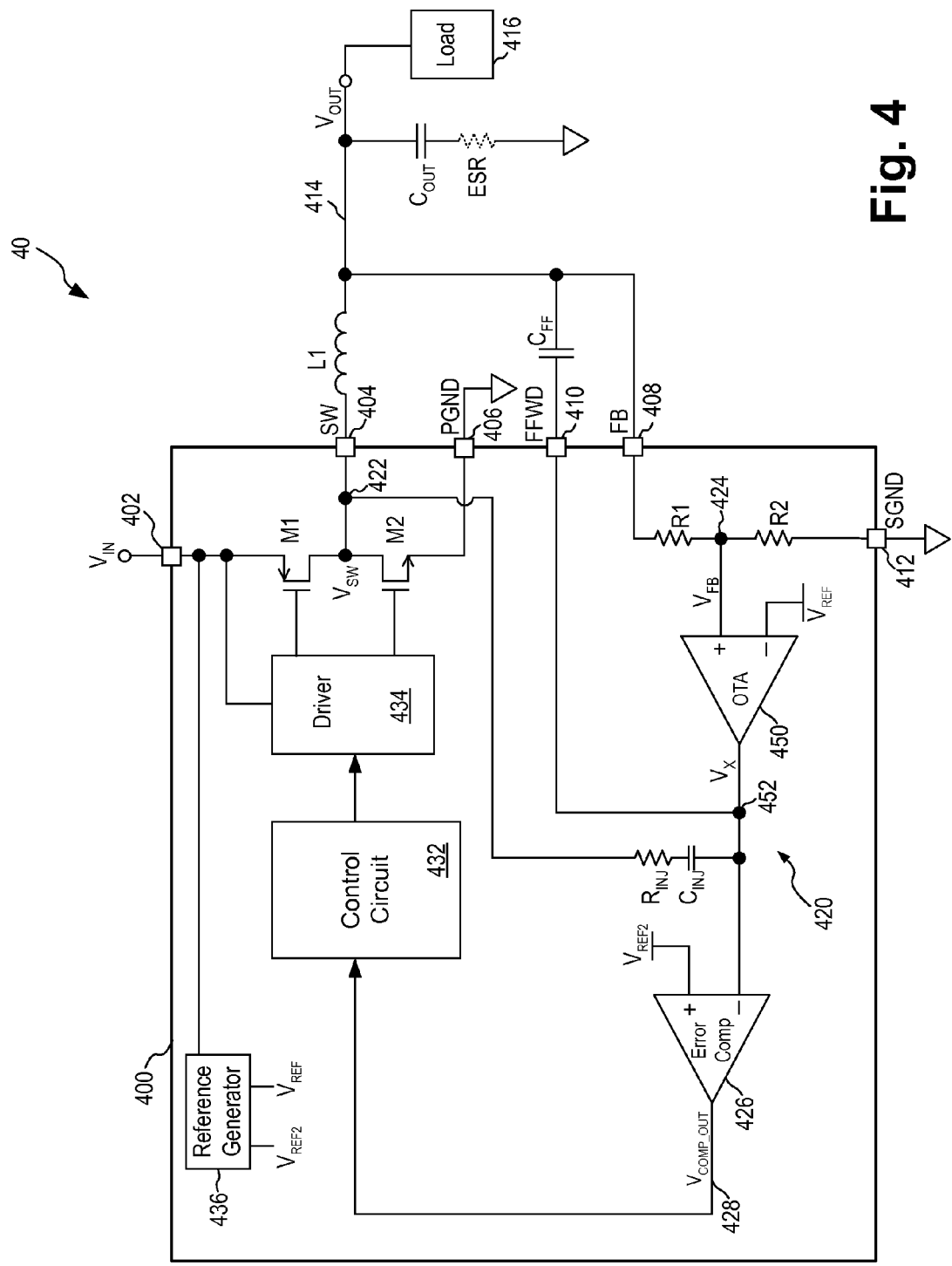
FIG. 4 is a schematic diagram of a constant on-time voltage regulator incorporating a ripple injection control scheme with improved output voltage accuracy according to one embodiment of the present invention.

According to another aspect of the present invention, a buck switching regulator using a constant on-time and variable off-time control loop incorporates a ripple injection circuit with improved accuracy where the ripple injection circuit injects the ripple voltage signal into a point in the feedback control loop of the voltage regulator apart from the feedback voltage node. FIG. 4 is a schematic diagram of a constant on-time voltage regulator incorporating a ripple injection control scheme with improved output voltage accuracy according to one embodiment of the present invention. Like elements in FIGS. 1 and 4 are given like reference numerals to simplify the discussion.

Referring to FIG. 4, a buck switching regulator system 40 includes a buck switching regulator 400 ("buck regulator 400") coupled to an output LC filter circuit. Buck regulator 400 receives an input voltage $V_{IN}$ and provides a switching output voltage $V_{SW}$ (terminal 404) to the output LC filter circuit formed by an inductor L1 and an output capacitor $C_{OUT}$. The output LC filter circuit generates a DC output voltage $V_{OUT}$ at an output voltage node 414 having substantially constant magnitude. In actual implementation, the output voltage $V_{OUT}$ is coupled to drive a load 416, as shown in FIG. 4. The output capacitor $C_{OUT}$ has associated with it a certain amount of ESR, as represented by the dotted-line resistor ESR connected in series with the output capacitor. When an output capacitor with zero ESR is used, resistor ESR has zero resistance and is therefore a short circuit.

Buck regulator 400 implements a constant on-time, variable off-time feedback control loop. The constant on-time feedback control loop of buck regulator 400 operates in the same manner as that of buck regulator 100 of FIG. 1 and will not be further described. Buck regulator 400 includes a ripple injection circuit 420 providing improved output voltage accuracy. The construction and operation of ripple injection circuit 420 for injecting the desired amount of ripple to the feedback control loop and for enhancing the output voltage accuracy will be described in detail below.

Buck switching regulator 400 includes a ripple injection circuit 420 working in conjunction with a feedforward capacitor $C_{FF}$ for generating a given amount of ripple from the switching output voltage and injecting the ripple voltage signal into the feedback control loop of the buck switching regulator system 40. More particularly, in ripple injection circuit 420, the ripple voltage signal is injected at a point in the feedback control loop separate from the feedback voltage $V_{FB}$. The impact of the voltage error caused by the ripple voltage signal on the output voltage $V_{OUT}$ is thereby significantly reduced, as will be described in more detail below.

Ripple injection circuit 420 includes an amplifier 450 inserted between the feedback voltage node 424 and the error comparator 426 of buck regulator 400. Amplifier 450 is coupled to receive the feedback voltage $V_{FB}$ on a non-inverting input terminal and a reference voltage $V_{REF}$ on an inverting input terminal. Amplifier 450 generates an output voltage $V_X$ at an output terminal 452 of the amplifier indicative of the difference between the feedback voltage $V_{FB}$ and the reference voltage $V_{REF}$. More specifically, the output voltage $V_{OUT}$ on node 414 is fed back through the feedback terminal (FB) 408 to a voltage divider formed by resistors R1 and R2. The feedback voltage $V_{FB}$ having the desired voltage level is generated at the output node 424 of the voltage dividers of resistors R1 and R2. The feedback voltage $V_{FB}$, being a divided down voltage of the output voltage $V_{OUT}$, is compared with the reference voltage $V_{REF}$ at amplifier 450 to generate output voltage $V_X$.

Output voltage $V_X$ is then coupled to the inverting input terminal of error comparator 426 to be compared with a second reference voltage $V_{REF2}$ which is coupled to the non-inverting input terminal of error comparator 426. Reference generator 436 generates the reference voltages $V_{REF}$ and $V_{REF2}$. Second reference voltage $V_{REF2}$ is a DC voltage selected to bias the error comparator 426 and amplifier 450 at an appropriate common-mode level. Error comparator 426 evaluates the difference between the output voltage $V_X$ and the second reference voltage $V_{REF2}$ and generates the output voltage signal $V_{COMP\_OUT}$ indicative of the difference between voltages $V_X$ and $V_{REF2}$. The output voltage $V_{COMP\_OUT}$ is coupled to a control circuit 432 to complete the constant on-time, variable off-time control loop of buck regulator 400. Control circuit 432 includes control logic circuitry as well as the timers for realizing the constant on-time and variable off-time control loop.

In the present embodiment, amplifier 450 is an amplifier with a large output impedance, such as a transconductance (Gm) amplifier. Furthermore, amplifier 450 should be an amplifier with a high DC gain but with an AC gain of 1. In one embodiment, amplifier 450 is a low-Gm operational transconductance amplifier (OTA) which has a high output impedance. When amplifier 450 has a high output impedance, the amplifier enables the feedforward transmission of the injected ripple voltage signal from the amplifier output terminal to the error comparator. When amplifier 450 is implemented as an OTA, buck switching regulator system 40 is able to preserve the good transient response and stability in the feedback control loop achieved in buck switching regulator system 10 without the additional amplifier. The low-Gm OTA operates to add gain only at very low frequencies and has a gain of 1 at higher frequencies without degrading the phase reserve.

Ripple injection circuit 420 further includes a resistor $R_{INJ}$ and a first capacitor $C_{INJ}$ connected in series between the switching output voltage $V_{SW}$ (node 422) and the output terminal 452 of amplifier 450. The feedforward FFWD terminal 410 of buck regulator 400 is also connected also to the output terminal 452 of amplifier 450. The output terminal 452 of amplifier 450 becomes the ripple injection node of the feedback control loop and the ripple injection node 452 is separate and apart from the feedback voltage node 424. Amplifier 450 has a high output impedance to allow the ripple voltage signal to be injected at its output terminal 452. When the feedforward capacitor $C_{FF}$ is connected between the output voltage $V_{OUT}$ (node 414) and the feedforward FFWD terminal 410 of buck regulator 100, the feedforward capacitor $C_{FF}$ is connected between the output voltage $V_{OUT}$ (node 414) and the ripple injection node 452. The amount of ripple signal generated at the ripple injection node 452, if any, is determined by the capacitance value of the feedforward capacitor $C_{FF}$.

The ripple injection circuit 420 is coupled to the switching output voltage node 422 so that the ripple voltage signal is generated from the switching output voltage $V_{SW}$. In other words, the ripple voltage signal is a divided-down signal of the switching output voltage $V_{SW}$ and is at the switching frequency of the switching output voltage. By including the ripple injection circuit and the feedforward capacitor $C_{FF}$, buck regulator 400 of the present invention can be coupled to an output capacitor $C_{OUT}$ having any value of ESR. That is, a zero-ESR capacitor, such as a ceramic capacitor, can be used as the output capacitor $C_{OUT}$ so that the ripple voltage at the output voltage $V_{OUT}$ is minimized. Meanwhile, the ripple injection circuit and the feedforward capacitor of the present invention operate to provide the necessary ripple for the feedback control loop. On the other hand, if a capacitor with a large ESR is used, the ripple injection circuit of the present invention can be deactivated by the feedforward capacitor $C_{FF}$ as no ripple generation is necessary.

The ripple voltage signal generated by the ripple injection circuit 420 is determined by the resistance of resistor $R_{INJ}$, and the capacitances of capacitor $C_{INJ}$ and feedforward capacitor $C_{FF}$. Resistor $R_{INJ}$ and capacitor $C_{INJ}$ function as a low-pass filter, generating a ripple voltage at node 452 which is capacitively divided between capacitor $C_{INJ}$ and capacitor $C_{FF}$. More specifically, the magnitude of the ripple voltage signal is given as (On-Time)*$(V_{IN}-V_{OUT})/R_{INJ}/(C_{INJ}+C_{FF})$. In this manner, the switching output voltage $V_{SW}$ is divided down to generate the ripple voltage signal. In one embodiment, the ripple voltage has a peak-to-peak magnitude of approximately 20 mV.

Feedforward capacitor $C_{FF}$ acts as a capacitive divider with capacitor $C_{INJ}$. Thus, the peak-to-peak voltage of the ripple voltage signal is made a function of the capacitance value of the feedforward capacitor $C_{FF}$. Accordingly, the capacitance value of feedforward capacitor $C_{FF}$ is used to program the ripple injection circuit to allow buck regulator 400 to work with output capacitor $C_{OUT}$ having any ESR values. More specifically, feedforward capacitor $C_{FF}$ is AC coupled between the output voltage $V_{OUT}$ and the voltage $V_X$. If the capacitance of capacitor $C_{FF}$ is very large, then capacitor $C_{FF}$ is a short circuit to the AC signals that may appear at the output voltage $V_{OUT}$ node 414. As such, the ripple injection circuit is shorted out by the large feedforward capacitor $C_{FF}$ and no ripple signal generated by the ripple injection circuit is injected to the ripple injection node 452. Instead, the output voltage $V_{OUT}$, with the ripple voltage component, is coupled to the voltage divider of the feedback control loop through FB terminal 408. The feedback voltage $V_{FB}$ is thus generated from an output voltage signal $V_{OUT}$ having the necessary ripple.

On the other hand, if the capacitance of capacitor $C_{FF}$ is very small or is zero, then capacitor $C_{FF}$ is an open circuit to the AC signals that may appear on the output voltage $V_{OUT}$ node 114. In this case, the ripple signal generated by the ripple injection circuit of capacitor $C_{INJ}$ and $R_{INJ}$ passes to the ripple injection node 452 and the maximum amount of ripple is provided to the feedback control loop.

Thus, in actual implementation, when an output capacitor $C_{OUT}$ with sufficiently large ESR is used, there is no need for ripple injection circuit 420 to generate any ripple voltage signal for the feedback control loop. When no ripple voltage signal from the ripple injection circuit is desired, a feedforward capacitor $C_{FF}$ having a large capacitance value is used where the large feedforward capacitor $C_{FF}$ essentially shorts out the effect of capacitor $C_{INJ}$ of the ripple injection circuit and the ripple signal generated by the ripple injection circuit is canceled out by the feedforward capacitor $C_{FF}$.

On the other hand, when an output capacitor $C_{OUT}$ with a small or zero ESR is used, the ripple injection circuit 420 is relied upon to provide the necessary ripple voltage signal for the feedback control loop. Thus, a feedforward capacitor $C_{FF}$ having a small capacitance value is used to allow the ripple signal generated by the ripple injection circuit 420 from the switching output voltage $V_{SW}$ to be passed to the ripple injection node 452. In this manner, the feedforward capacitor $C_{FF}$ thus operates to adjust the amount of ripple voltage that is to be provided by the ripple injection circuit 420. In one embodiment, the feedforward capacitor $C_{FF}$ has a capacitance value in the range of 220 pF to 2.2 nF.

Buck regulator 400 can thus work with output capacitor having any ESR value simply by selecting the corresponding capacitance value for the feedforward capacitor. The ripple injection circuit 420 in buck regulator 400 realizes many of the same advantages as ripple injection circuit 420 buck regulator 100 described above and will not be further described here.

As thus configured, ripple injection circuit 420 modifies the feedback control loop of buck regulator 400. In operation, when voltage $V_X$ drops below the reference voltage $V_{REF2}$, the high-side switch M1 is turned on for a fixed on-time $t_{ON}$. After the fixed on-time $t_{ON}$, the high-side switch M1 is turned off and the low-side switch M2 is turned on for at least the minimum off-time. When voltage $V_X$ drops below reference voltage $V_{REF2}$, the high-side switch M1 is turned on again. Ripple injection circuit 420 injects the ripple voltage signal onto output voltage $V_X$ of amplifier 450. That is, the ripple voltage signal is injected after the gain stage of amplifier 450.

As in the case of buck regulator 100, the voltage waveform of voltage $V_X$ at the input of error comparator 426 will be asymmetric about $V_{REF2}$ and will vary with the input voltage $V_{IN}$, the output voltage $V_{OUT}$ and the load current. However, the inaccurate comparator input has been moved to the ripple injection node 452 instead of the feedback voltage node 424. The resulting voltage error at the feedback voltage node 424 is equal to the voltage error at the ripple injection node divided by the gain of amplifier 450. By inserting the gain stage of amplifier 450, the DC error at the output voltage $V_{OUT}$ is greatly reduced. More specifically, the offset error at the feedback voltage node is now 1/A times the offset error of the average DC voltage of voltage $V_X$, where A is the DC gain of amplifier 450. The output voltage $V_{OUT}$ experiences a DC error that is significantly reduced by the DC gain of amplifier 450 and the output voltage can be regulated to a high degree of accuracy. In one embodiment, the DC gain A of amplifier 450 is 600 or more. Thus, when the error voltage $V_{ERR2}$ is 10 mV, the DC residual voltage error appearing at the output voltage $V_{OUT}$ becomes only 16 µV, representing a significant reduction in error and a significant improvement in accuracy.

Alternate Embodiment

In some applications, buck switching regulator system 40 may be applied to operate in the discontinuous conduction mode (DCM). In DCM, the low-side switch M2 is not allowed to conduct current in the reverse direction. When the current reverses, the low-side switch M2 is turned off and the output capacitor supplies the load current until voltage $V_X$ drops below reference voltage $V_{REF2}$, at which point the high-side switch M1 is turned back on again.

However, under very light load conditions, the feedback voltage $V_{FB}$ can be greater than the reference voltage $V_{REF}$ for a long period of time. During this period, amplifier 450 pulls voltage $V_X$ to a much higher voltage level than voltage $V_{REF2}$. Then, when a load step occurs, voltage $V_X$ has to decrease by a large amount of voltage before the feedback control loop can turn on the high-side switch again. In accordance with an alternate embodiment of the present invention, a clamp circuit is added to ripple injection circuit to limit the voltage swing of voltage $V_X$, thereby improving the transient response of the buck regulator operating in DCM under changing load conditions.

Figure 5:
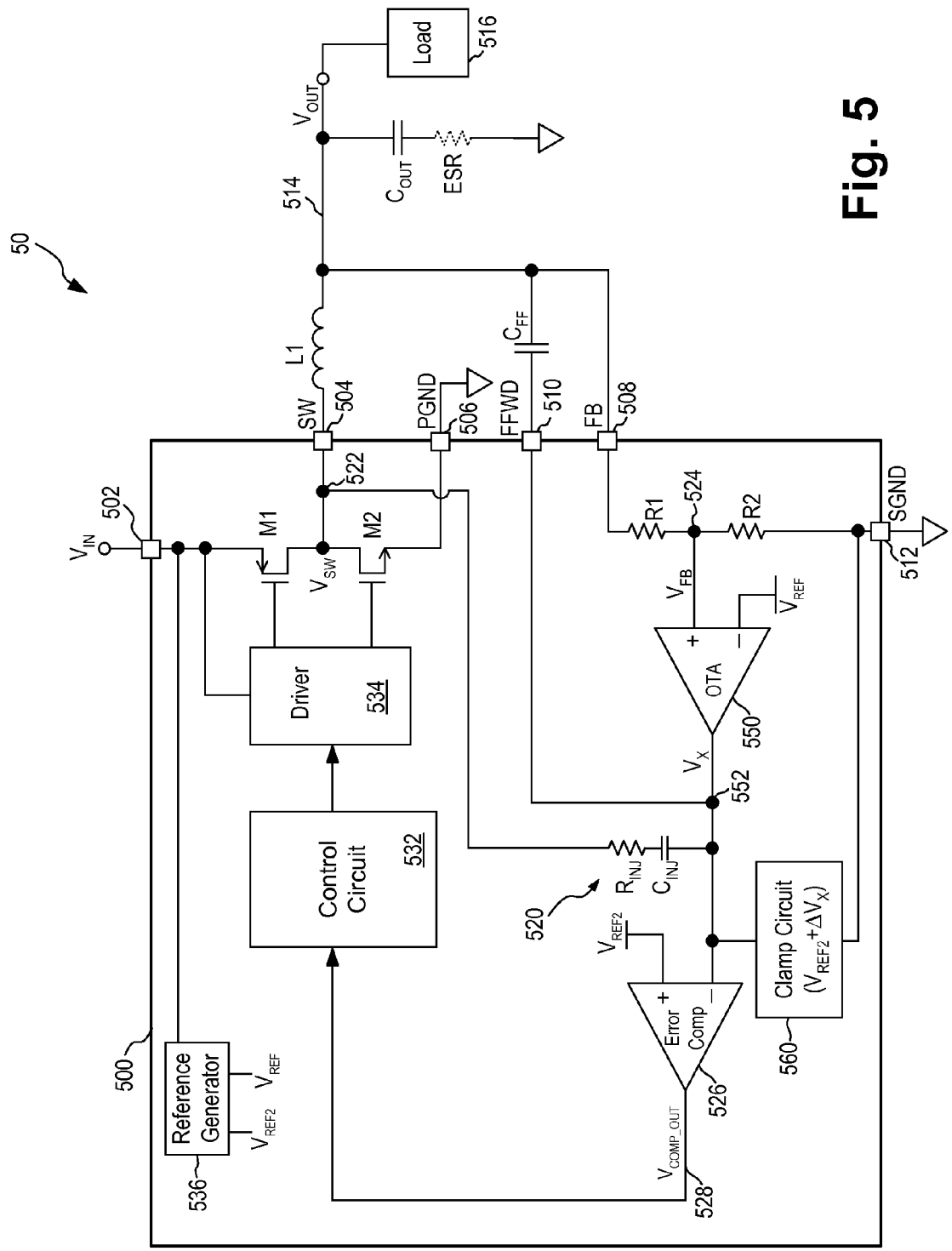
FIG. 5 is a schematic diagram of a constant on-time voltage regulator incorporating a ripple injection control scheme with improved output voltage accuracy according to an alternate embodiment of the present invention.

FIG. 5 is a schematic diagram of a constant on-time voltage regulator incorporating a ripple injection control scheme with improved output voltage accuracy according to an alternate embodiment of the present invention. Like elements in FIGS. 4 and 5 are given like reference numerals to simplify the discussion. Referring to FIG. 5, buck regulator 500 in buck switching regulator system 50 is constructed in the same manner as buck regulator 400 of FIG. 4 except for the addition of a clamp circuit 560. Thus, buck regulator 500 operates in the same manner as buck regulator 400 except for the clamping operation and the detail operation will not be further described. Clamp circuit 560 is coupled to ripple injection node 552 and operates to limit voltage $V_X$ at node 552 to an amount $\Delta V_X$ above reference voltage $V_{REF2}$. Thus, voltage $V_X$ will not increase beyond $V_{REF2}+\Delta V_X$ even in light load conditions. When a load step occurs, voltage $V_X$ only has to decrease by voltage amount $\Delta V_X$ before the feedback control loop will act to turn on the high-side switch. In one embodiment, the voltage amount $\Delta V_X$ is about 15 mV.

In the embodiments shown in FIGS. 4 and 5, the feedforward capacitor $C_{FF}$ is formed external to the integrated circuit of the buck regulator 400 and 500 to allow different capacitance values of the feedforward capacitor to be used to coordinate with the ESR characteristics of the output capacitor $C_{OUT}$. The amount of injected ripple voltage can thus be fine-tuned by the feedforward capacitance $C_{FF}$. However, in other embodiments, the ripple injection circuit and the feedforward capacitor $C_{FF}$ can both be integrated onto the buck regulator integrated circuit to reduce the number of external components in the buck switching regulator system 40 and 50. When integrated, the feedforward capacitor $C_{FF}$ can have a capacitance value suitable for a given range of ESR values of the output capacitor.

Furthermore, in the embodiments shown in FIGS. 4 and 5, the ripple injection circuit including amplifier 450, 550 and the voltage divider of resistors R1/R2 are shown as being integrated on the same integrated circuit of buck regulator 400, 500. Furthermore, the clamp circuit 560 is shown as being integrated on the same integrated circuit of buck regulator 500. In the present embodiments, one or more components of the ripple injection circuit can be formed off-chip from the integrated circuit of the buck regulator. The amount of integration of circuit elements onto a single integrated circuit is a matter of design choice. Implementation of the ripple injection circuit of the present invention is not limited to any specific degree of integration. In one embodiment, the voltage dividers R1/R2 and the OTA are formed off-chip from the integrated circuit of the buck regulator. In fact, any of the voltage dividers R1/R2, feedforward capacitor $C_{FF}$, the operational transconductance amplifier, the injection capacitor $C_{INJ}$ and resistor $R_{INJ}$, and the clamp circuit can be formed on-chip or off-chip from the buck regulator. The exact degree of integration is not critical to the practice of the present invention.

Figure 6:
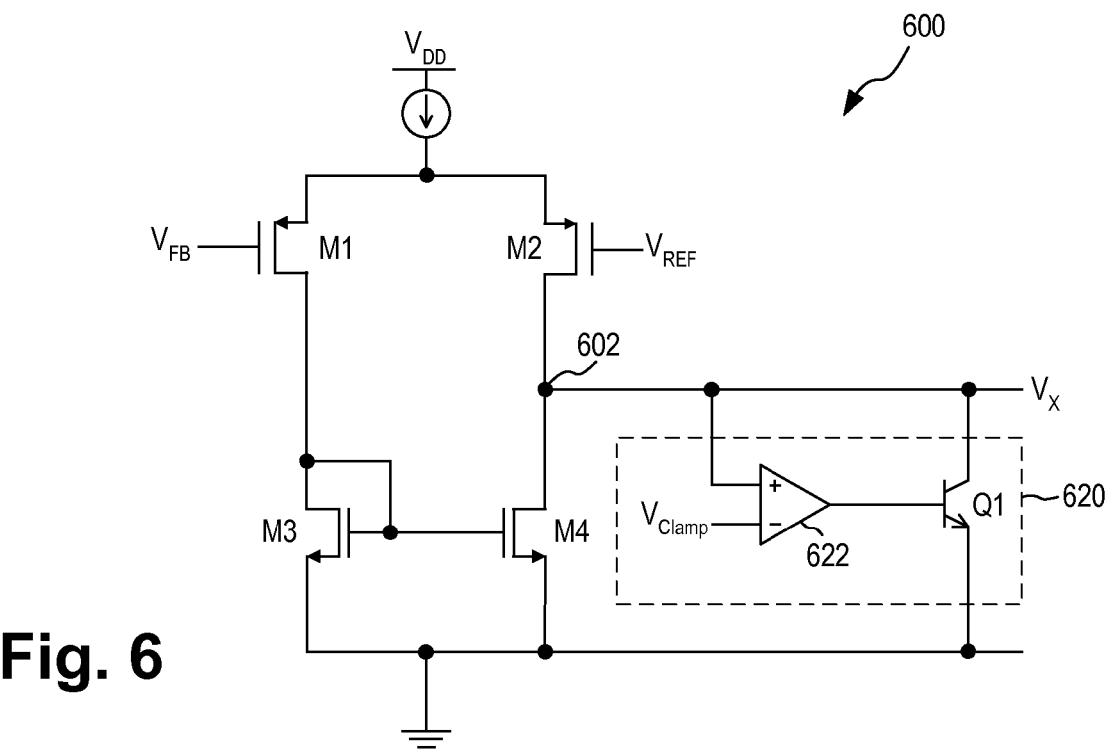
FIG. 6 is a transistor level circuit diagram of an operational transconductance amplifier and a clamp which can be incorporated in the constant on-time voltage regulator of FIG. 4 (without the clamp circuit) and 5 according to one embodiment of the present invention.

FIG. 6 is a transistor level circuit diagram of an operational transconductance amplifier and a clamp which can be incorporated in the constant on-time voltage regulator of FIGS. 4 (without the clamp circuit) and 5 according to one embodiment of the present invention. Referring to FIG. 6, transistors M1, M2, M3 and M4 form an operational transconductance amplifier (OTA) 600 for receiving the feedback voltage $V_{FB}$ and the reference voltage $V_{REF}$ and generating the output voltage $V_X$. OTA 600 has a high output impedance at output node 602 to allow the ripple voltage signal to be injected onto the output voltage $V_X$.

Figure 7:
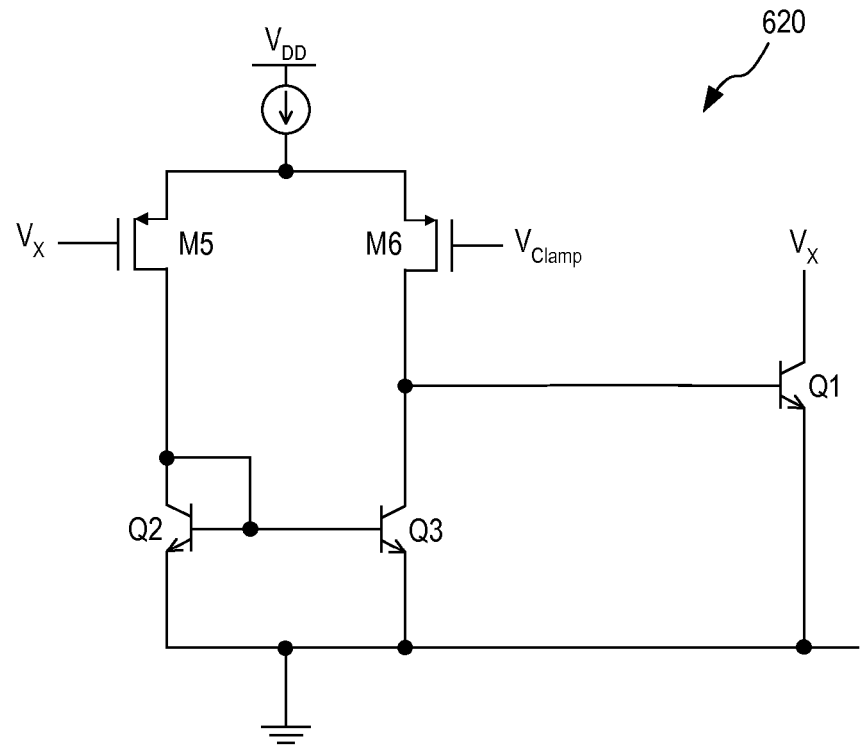
FIG. 7 is a transistor level circuit diagram of a clamp circuit which can be incorporated in the constant on-time voltage regulator of 5 according to one embodiment of the present invention.

In FIG. 6, OTA 600 is shown incorporated with a clamp circuit 620. Clamp circuit 620 is optional and is not used in the implementation of the OTA in FIG. 4. Clamp circuit 620 is incorporated when clamping of the output voltage $V_X$ is desired, as illustrated with reference to the embodiment in FIG. 5. Clamp circuit 620 includes an amplifier 622 for comparing the output voltage $V_X$ to a clamp voltage $V_{Clamp}$. The output signal from amplifier 622 drives the base terminal of NPN bipolar transistor Q1. Transistor Q1 is connected across the output voltage $V_X$ and the ground voltage to maintain the output voltage $V_X$ at the clamp voltage $V_{Clamp}$ level. In one embodiment, the clamp voltage $V_{Clamp}$ is set at $V_{REF2}+\Delta V_X$. FIG. 7 is a transistor level circuit diagram of a clamp circuit which can be used to implement clamp circuit 620 of FIG. 6.

Multi-Mode On and Off Time Control

In the buck regulators described above, a constant on-time control and variable off-time control scheme is applied to control the switching of the high-side and low-side switches. More specifically, the constant on-time, given by equation (2) above, is a function of the input voltage $V_{IN}$. The operating frequency of the buck regulator is stable while the duty cycle varies as the off-time is adjusted from a minimum off-time to an increasing amount. Under this operation regime, even when the feedback voltage $V_{FB}$ is below the reference voltage $V_{REF}$ at the end of the constant on-time, the high-side switch is turned off and the low-side switch is turned on for the minimum off-time before the high-side switch can be turned on again. The requirement of the minimum off-time is to ensure sufficient set-up time for the control circuit, particularly the set-up time for the error comparator. In some cases, it is desirable to keep the high-side switch turned on until the feedback voltage reaches the reference voltage.

Furthermore, although ideally, the buck regulator can reach up to a 100% duty cycle, the minimum on-time requirement limits the duty cycle of the buck regulator. The delay time for turning on and off the switches also limits the duty cycle. In addition, if current sensing is required on the low-side switch, such as for current limit or discontinuous conduction mode, enough time must be provided to carry out the current sensing functions. The maximum duty cycle achievable is then limited to $$D_{max}=t_{on}/(t_{on}+t_{off,min}).$$

While it is possible to increase the maximum duty cycle by increasing on-time $t_{ON}$, increasing on-time $t_{on}$ may have undesirable consequences. First, an increased on-time leads to higher inductor current ripple and may not always be practical. Second, the on-time cannot be allowed to extend for too long. While it is possible to allow the on-time to be extended until the feedback voltage $V_{FB}$ is lifted above the reference voltage $V_{REF}$, such a condition may lead to an undesirable result, particularly when there is a short circuit condition. Under a short condition, the feedback voltage is not able to increase above the reference voltage and the high-side switch will never get turned off, resulting in the inductor current becoming extremely high. Finally, if the on-time is expanded too much, poor transient response can result. Consider a situation where the load current steps from a small current to a large current. Because the current step causes the feedback voltage $V_{FB}$ to drop below the reference voltage $V_{REF}$, the regulator control loop attempts to increase the on-time $t_{on}$ as much as possible. If on-time $t_{on}$ is increased too long, the inductor current will go well above the load current and when the high-side switch is finally turned off and the low-side switch turns on, the energy stored in the inductor will cause the output voltage to overshoot its target.

Figure 8:
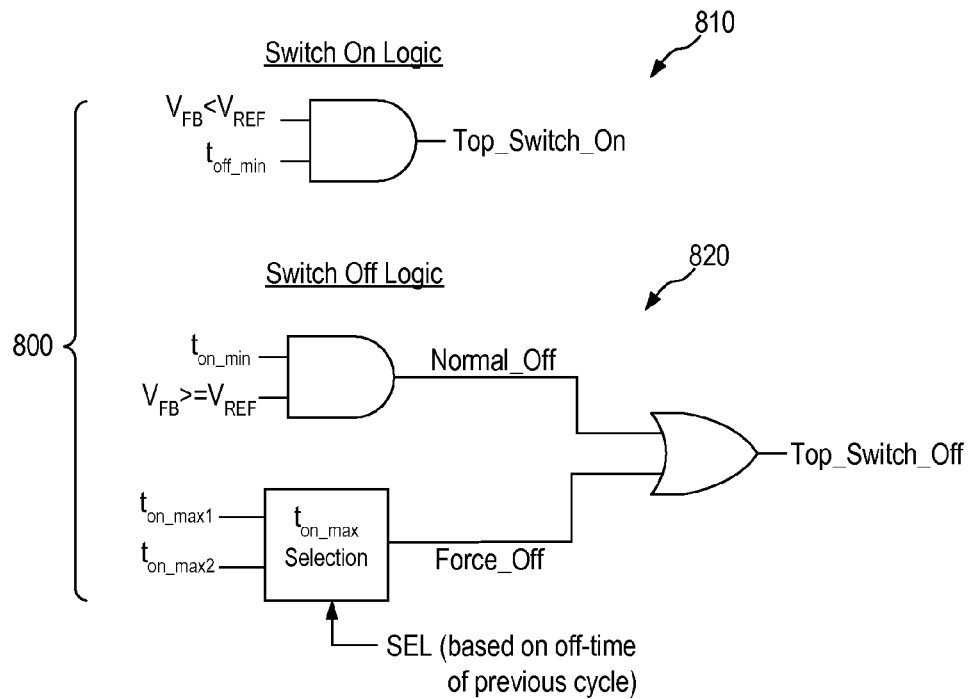
FIG. 8 is a logic diagram of an on and off time control circuit for implementing the multi-mode on and off time control scheme in a buck switching regulator according to one embodiment of the present invention.

According one aspect of the present invention, a buck switching regulator implements a multi-mode on and off time control scheme for realizing a constant on-time, variable off-time control loop. The multi-mode on and off time control scheme can be incorporated in the buck switching regulator of FIGS. 1, 4 and 5 to allow the buck switching regulator to operate at high duty cycles. FIG. 8 is a logic diagram of an on and off time control circuit for implementing the multi-mode on and off time control scheme in a buck switching regulator according to one embodiment of the present invention. In one embodiment, on-time control circuit 800 is implemented in the logic circuit 132 of buck regulator 100 or in the control circuits 432 and 532 of buck regulators 400 and 500 to realize the multi-mode on and off time control scheme in accordance with the present invention. It is imperative to note that FIG. 8 is provided merely to illustrate the logical relationship between the different operating signals and timers of the on-time control circuit and is not intended to illustrate the literal implementation of the on-time control circuit. Upon being apprised of the present invention, one of ordinary skill in the art would appreciate that the on-time control circuit can be implemented in many different ways using various circuit elements.

Referring to FIG. 8, on-time control circuit 800 includes a first logic circuit 810 for generating a Top_Switch_On signal for turning on the high-side switch and a second logic circuit 820 for generating a Top_Switch_Off signal for turning off the high-side switch. The multi-mode on and off time control scheme operates as follows. In first logic circuit 810, the Top_Switch_On signal is asserted when the feedback voltage $V_{FB}$ is less than the reference voltage $V_{REF}$ and the minimum off-time has been reached. With the high-side switch is turned on, the Top_Switch_Off signal is asserted either when the Normal_Off signal is asserted or when the Force_Off signal is asserted. When at least a minimum on-time $t_{on\_min}$ is reached and the feedback voltage $V_{FB}$ is greater than or equal to the reference voltage $V_{REF}$, the Normal_Off signal is asserted. Thus, the high-side switch is turned on for at least the minimum on-time $t_{on\_min}$ and is allowed to stay on until the feedback voltage $V_{FB}$ is greater than or equal to the reference voltage $V_{REF}$. However, on-time control circuit 800 imposes two maximum on-time limits for the high-side switch. When either maximum on-time $t_{on\_max1}$ or maximum on-time $t_{on\_max2}$ is reached, the Force_Off signal is asserted. When the Force_Off signal is asserted, the Top_Switch_Off signal is asserted and the high-side switch is turned off regardless of the feedback voltage $V_{FB}$ value. That is, when the Force_Off signal is asserted, the high-side switch is turned off even when the feedback voltage $V_{FB}$ is less than the reference voltage.

The two maximum on-time limits operate to provide a first maximum on-time $t_{on\_max1}$ and a second, extended maximum on-time $t_{on\_max2}$. That is, the second maximum on-time $t_{on\_max2}$ is greater than the first maximum on-time $t_{on\_max1}$. In operation, the first maximum on-time $t_{on\_max1}$ is applied but under certain specific conditions, the on-time is allowed to be extended to the second maximum on-time $t_{on\_max2}$. As will be described in more detail below, the first maximum on-time $t_{on\_max1}$ is selected when the off-time in the previous switching cycle was not a minimum off-time while the second, extended maximum on-time $t_{on\_max2}$ is selected when the off-time in the previous switching cycle was a minimum off-time.

The multi-mode on and off time control scheme operates as follows. At low to medium duty cycles, the on-time control circuit implements a constant on-time and controls the off-time of the high-side switch to achieve regulator. Then at high duty cycles, the off-time is fixed at the minimum off-time and the on-time control circuit controls the on-time to achieve regulation. At the limits, a maximum duty cycle of $t_{on,max}/(t_{on,max}+t_{off,min})$ is realized which approaches 100% when $t_{on,max}$ is allowed to be selectively expanded to a large value under certain conditions. The maximum on-time extension is realized by using two maximum on-times with the second maximum on-time being a large value.

Figure 9:
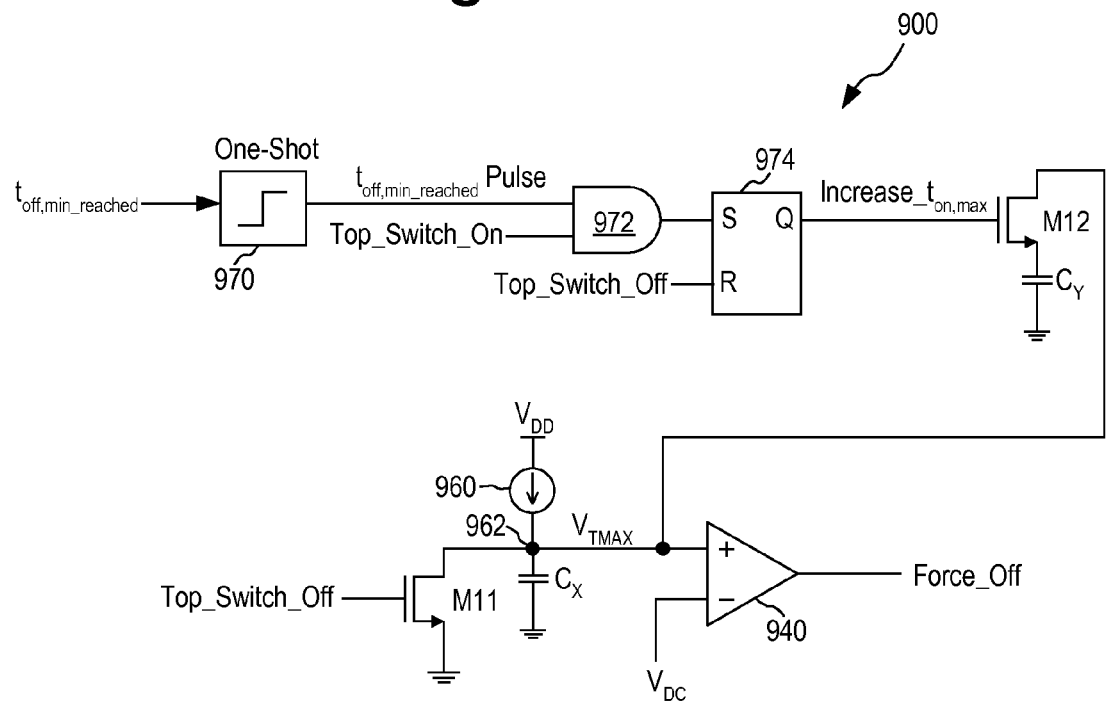
FIG. 9 is a schematic diagram of a maximum on-time control circuit according to one embodiment of the present invention.

FIG. 9 is a schematic diagram of a maximum on-time control circuit according to one embodiment of the present invention. Referring to FIG. 9, maximum on-time control circuit 900 generates the Force_Off signal at the expiration of either the first maximum on-time $t_{on\_max1}$ or second maximum on-time $t_{on\_max2}$. In maximum on-time circuit 900, the first maximum on-time $t_{on\_max1}$ is established by a first timer circuit formed by capacitor a current source 960 and an NMOS transistor M11. In operation, when the high-side switch is turned off (Top_Switch_Off signal being asserted), transistor M11 is turned on to discharge capacitor $C_X$. The voltage $V_{TMAX}$ at node 962 is thus at or near the ground voltage. A comparator 940 compares the capacitor voltage $V_{TMAX}$ of capacitor $C_X$ (node 962) with a DC voltage VDC. When voltage $V_{TMAX}$ is less than the DC voltage VDC, comparator 940 generates the Force_Off signal having a logical low level.

Then, when the Top_Switch_Off signal is deasserted to turn on the high-side switch, transistor M11 is turned off and current source 960 is allowed to charge up capacitor $C_X$. When voltage $V_{TMAX}$ at the top plate (node 962) of capacitor $C_X$ reaches the voltage VDC, comparator 940 switches state and generates the Force_Off signal having a logical high level. The logical high level of the Force_Off signal indicates that the Force_Off signal is asserted and the Top_Switch_Off signal is accordingly asserted. In this manner, the capacitance of capacitor $C_X$, or the time for capacitor $C_X$ to be charged up to the VDC voltage, establishes the first maximum on-time $t_{on,max1}$.

In accordance with one embodiment of the present invention, maximum on-time control circuit 900 provides a second, extended maximum on-time $t_{on,max2}$ under certain conditions. Under those conditions, the maximum on-time is allowed to extend beyond the first maximum on-time $t_{on,max1}$ when a minimum off-time has been used in the previous switching cycle. To that end, maximum on-time control circuit 900 includes a second timer circuit which operates to add a capacitor $C_Y$ in parallel with capacitor $C_X$ when a minimum off-time has been used in the previous switching cycle. The total capacitance provided by capacitor $C_Y$ and capacitor $C_X$ extends the time it takes to charge up voltage $V_{TMAX}$ to DC voltage VDC and therefore extends the maximum on-time to $t_{on,max2}$. If at the previous switching cycle, the off-time is greater than the minimum off-time, then the maximum on-time will not be extended and the maximum on-time imposed by capacitor $C_X$ will hold.

Figure 10:
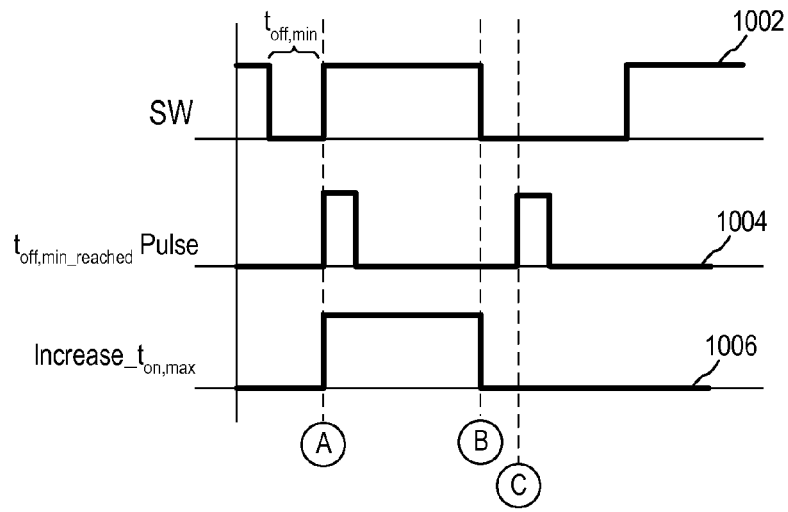
FIG. 10 is a timing diagram illustrating the operation of the maximum on-time control circuit of FIG. 9.

The construction and operation of the second timer circuit will be described with reference to FIG. 9 and also to the timing diagram of FIG. 10. The second timer circuit includes a one-shot circuit 970 receiving a signal $t_{off,min\_reached}$ which is asserted when the minimum off time has been reached. The one-shot circuit 970 generates a $t_{off,min\_reached}$ pulse (waveform 1004). The $t_{off,min\_reached}$ pulse is logically ANDed (AND gate 972) with a Top_Switch_On signal indicative of the high-side switch being turned on. Thus, if the high-side switch is turned on at the same time as the $t_{off,min\_reached}$ pulse, then this is an indication that in the previous switching cycle, a minimum off-time is used. The output of AND gate 972 is therefore asserted. When the high-side switch is not turned on at the end of the minimum off-time, the output of AND gate 972 is not asserted.

AND gate 972 drives the set input terminal of a set-reset flip-flop 974. The reset input terminal is driven by the Top_Switch_Off signal. The output signal Q of set-reset flip-flop 974 is the Increase_$t_{on,max}$ signal which is coupled to drive the gate terminal of an NMOS transistor M12. The drain terminal of NMOS transistor M12 is connected to node 962 while the source terminal is connected to capacitor $C_Y$. When the Increase_to max signal is asserted, transistor M12 is turned on to connect capacitor $C_Y$ in parallel with capacitor $C_X$. When the Increase_$t_{on,max}$ signal is not asserted, transistor M12 is turned off.

The Increase_$t_{on,max}$ signal is asserted when AND gate 972 asserts its output signal, thereby setting the output signal Q of flip-flop 974 to a logical high. When the Top_Switch_Off signal is asserted, the output signal Q of flip-flop 974 is reset to a logical low. When neither the set nor the reset input terminal is asserted, the output signal Q of flip-flop 974 remains in the previous logical state.

The operation of the second timer circuit is as follows. When the minimum off-time is reached (time A), the $t_{off,min\_reached}$ signal is asserted and one-shot circuit 970 generates the $t_{off,min\_reached}$ pulse (waveform 1004). Then if the Top_Switch_On signal is asserted to turn on the high-side switch (waveform 1002) at the same time (time A), AND gate 972 asserts its output. Flip-Flop 974 thus is thus set and the Increase_$t_{on,max}$ signal (waveform 1006) is asserted. Transistor M12 is turned on and capacitor $C_Y$ is connected in parallel with capacitor $C_X$ to increase the maximum on-time. Because of the $t_{off,min\_reached}$ pulse, AND gate 972 asserts the set input terminal only for the duration of the $t_{off,min\_reached}$ pulse. However, the Increase_$t_{on,max}$ signal remains asserted until the Top_Switch_Off signal is asserted (time B) to reset the Increase_$t_{on,max}$ signal.

On the other hand, at the next switching cycle, when the minimum off-time is reached but the Top_Switch_On signal is not asserted (time C), AND gate 972 does not assert it's output signal and the Increase_$t_{on,max}$ signal remains reset. That is, when the minimum off-time is reached but the high-side switch is not turned on, then maximum on-time control circuit 900 determines that the previous switching cycle does not involve a minimum off time. In that case, no extension of the maximum on-time is needed.

The maximum on-time control circuit 900, when implemented in a buck regulator, provides many advantages for improving the operation of the buck regulator. First, maximum on-time control circuit 900 provides two maximum on-times—the first maximum on-time $t_{on\_max1}$ and the second, extended maximum on-time $t_{on\_max2}$. The extended maximum on-time is provided only under conditions when a higher duty cycle is desired. That is, the extended maximum on-time is provided when the previous switching cycle uses a minimum off-time. At low to medium duty cycles, the buck regulator is unaffected by the two maximum on-times because the control loop is controlling an off-time that is greater than the minimum off-time $t_{off,min}$. At higher duty cycles, the buck regulator starts regulating by using the minimum off-time $t_{off,min}$ and controlling the on-time $t_{on}$. In this region, the on-time $t_{on}$ is expanded until the feedback voltage $V_{FB}$ reaches the reference voltage $V_{REF}$, typically before the maximum on-time $t_{on,max1}$ is reached. But as the duty cycle continues to increase, the required on-time becomes greater than the first maximum on-time $t_{on,max1}$. To allow for higher duty cycles to be achieved, the second, extended maximum on-time $t_{on,max2}$ is used under certain conditions. Transient overshoots are prevented because the maximum on-time $t_{on,max}$ is expanded only when the previous switching cycle uses a minimum off-time. During a transient condition, the maximum on-time is not expanded as the off-time is typically greater than the minimum off-time during transient conditions.

Figure 11:
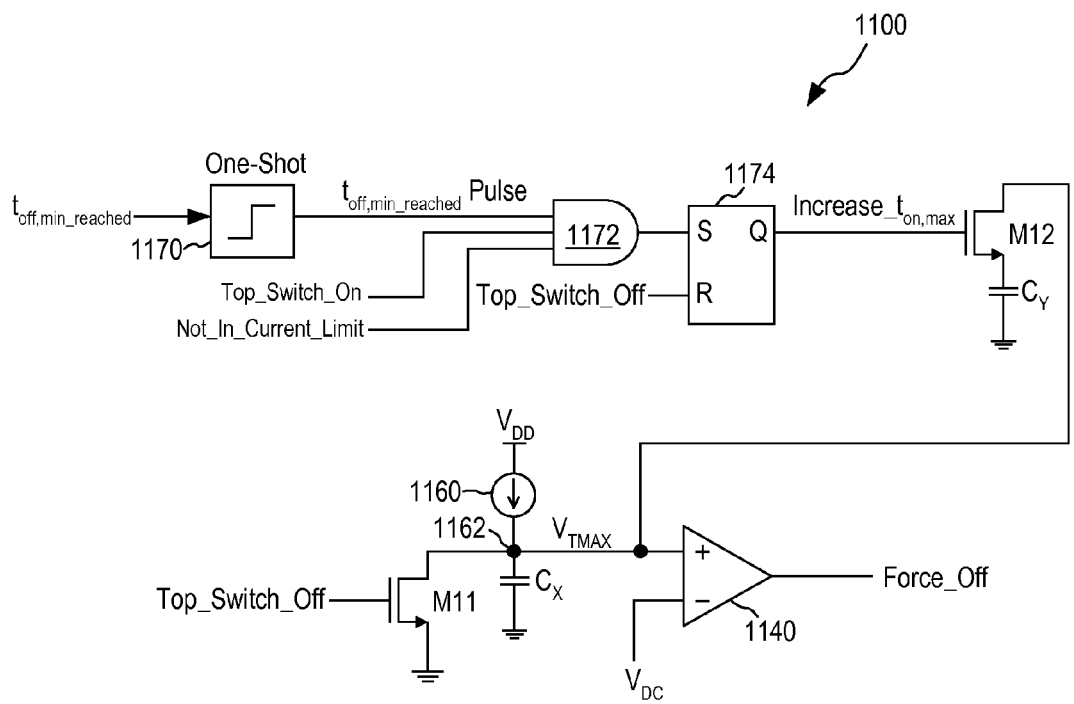
FIG. 11 is a schematic diagram of a maximum on-time control circuit according to an alternate embodiment of the present invention.

FIG. 11 is a schematic diagram of a maximum on-time control circuit according to an alternate embodiment of the present invention. Referring to FIG. 11, maximum on-time control circuit 1100 is configured in the same manner as maximum on-time control circuit 900 but with additional circuitry for protecting against short-circuit conditions. More specifically, maximum on-time control circuit 1100 is configured to disable maximum on-time expansion when there is a short circuit condition. When there is a short circuit condition, the output current reaches the current limit. In maximum on-time control circuit 1100, a Not_In_Current_Limit signal is coupled to AND gate 1172 to be logically ANDed with the $t_{off,min\_reached}$ pulse and the Top_Switch_On pulse. Thus, in addition to the previous two conditions (minimum off-time reached and high-side switched turned on), AND gate 1172 can assert its output signal to set flip-flop 1174 only when the output current is not being current limited, indicating there is no short circuit at the output of the buck switching regulator. In this manner, the maximum on-time is not extended when there is a short condition detected at the switching regulator.

The above detailed descriptions are provided to illustrate specific embodiments of the present invention and are not intended to be limiting. Numerous modifications and variations within the scope of the present invention are possible. The present invention is defined by the appended claims.

I claim:

1. A buck switching regulator formed on an integrated circuit and receiving an input voltage, the buck switching regulator controlling a high-side switch and a low-side switch using a feedback control loop to drive a switch output node for generating a switching output voltage, the switch output node being coupled to an LC filter circuit external to the integrated circuit to generate a regulated output voltage having a substantially constant magnitude on an output node, the regulated output voltage being fed back to the buck switching regulator to a voltage divider for generating a feedback voltage on a feedback voltage node, the buck switching regulator comprising:

an on-time control circuit for generating a first signal for controlling the high-side switch under a minimum on-time and variable off-time feedback control loop, the first signal turning off the high-side switch at the expiration of a first on-time duration or at the expiration of a maximum on-time, the first on-time duration being at least a minimum on-time and being expanded to the maximum on-time when the feedback voltage remains less than a reference voltage, and the maximum on-time comprising a first maximum on-time and a second, extended maximum on-time greater than the first maximum on-time, wherein the second, extended maximum on-time is applied when a minimum off-time was used for the high-side switch during the previous switching cycle.

2. The buck switching regulator of claim 1, wherein the first maximum on-time is set by a first capacitor and the second maximum on-time is set by the addition of a second capacitor in parallel with the first capacitor.

3. The buck switching regulator of claim 1, wherein the first maximum on-time is set by a first capacitance value and the second maximum on-time is set by the addition of a second capacitance value to the first capacitance value.

4. The buck switching regulator of claim 1, wherein the second, extended maximum on-time is applied when a minimum off-time was used for the high-side switch during the previous switching cycle and when an output current of the switching regulator is not being current limited.

5. The buck switching regulator of claim 1, wherein the on-time control circuit comprises a maximum on-time control circuit for generating a second signal at the expiration of the first maximum on-time or the second maximum on-time, the maximum on-time control circuit comprising:
   a first timer circuit comprising a first capacitor connected in parallel with a first transistor between a first node and a ground node, and a current source coupled to charge the first capacitor, the first transistor being controlled by the first signal; and
   a comparator comparing a first voltage at the first node to a second DC reference voltage, the comparator generating an output voltage being the second signal, the second signal being asserted when the first voltage is equal to or greater than the second DC reference voltage,
   wherein when the high-side switch is turned off, the first signal is asserted to turn on the first transistor, thereby discharging the first capacitor; and when the high-side switch is turned on, the first signal is deasserted to turn off the first transistor to allow the first capacitor to be charged by the current source, the first voltage thereby increasing, and wherein the first maximum on-time comprises the time duration for the first voltage to reach the second DC reference voltage.

6. The buck switching regulator of claim 5, wherein the maximum on-time control circuit further comprises:
   a second timer circuit comprising a second transistor connected in series with a second capacitor between the first node and the ground node, the second transistor being controlled by a third signal, the third signal being asserted to turn on the second transistor when a minimum off-time is used for the high-side switch during a previous switching cycle,
   wherein the second transistor is turned on to connect the second capacitor in parallel with the first capacitor, and wherein the second maximum on-time comprises the time duration for the first voltage to reach the second DC reference voltage by charging of the first and second capacitors.

7. The buck switching regulator of claim 6, wherein the second timer circuit further comprises:
   a one-shot circuit for generating a minimum-off-time pulse indicative of the minimum off-time being reached;
   a first logic gate for receiving the minimum-off-time pulse and a fourth signal and generating an output signal being asserted when the fourth signal is asserted during the minimum-off-time pulse; and
   a set-reset flip-flop having a set input terminal receiving the output signal of the first logic signal, a reset input terminal receiving the first signal and an output terminal generating the third signal.

8. The buck switching regulator of claim 7, wherein the first logic gate further receives a fifth signal indicating that an output current of the switching regulator is not being current limited, the first logic gate asserting the output signal when the fourth signal is asserted during the minimum-off-time pulse and the fifth signal is asserted.

9. A method in buck switching regulator receiving an input voltage and controlling a high-side switch and a low-side switch using a feedback control loop to drive a switch output node for generating a switching output voltage, the switch output node being coupled to an LC filter circuit to generate a regulated output voltage having a substantially constant magnitude on an output node, the regulated output voltage being fed back to the buck switching regulator to a voltage divider for generating a feedback voltage on a feedback voltage node, the method comprising:
   providing a first on-time duration for the high-side switch being at least a minimum on-time and being expanded to a maximum on-time when the feedback voltage remains less than a reference voltage;
   providing a first maximum on-time or a second, extended maximum on-time greater than the first maximum on-time as the maximum on-time;
   applying the first maximum on-time when a minimum off-time was not used for the high-side switch during the previous switching cycle;
   applying the second, extended maximum on-time when a minimum off-time was used for the high-side switch during the previous switching cycle; and
   generating a first signal for turning off the high-side switch under a minimum on-time and variable off-time feedback control loop, the first signal turning off the high-side switch at the expiration of the first on-time duration or at the expiration of the first or second maximum on-times.

10. The method of claim 9, wherein providing a first maximum on-time comprises providing the first maximum on-time by charging of a first capacitor and providing a second, extended maximum on-time comprises providing the second, extended maximum on-time by charging of the first capacitor and a second capacitor connected in parallel with the first capacitor.

11. The method of claim 9, wherein providing a first maximum on-time comprises providing the first maximum on-time by charging of a first capacitance value and providing a second, extended maximum on-time comprises providing the second, extended maximum on-time by charging of a second capacitance value being the sum of the first capacitance value and a third capacitance value.

12. The method of claim 9, wherein providing a second, extended maximum on-time greater than the first maximum on-time comprises providing the second, extended maximum on-time when a minimum off-time is used for the high-side switch during a previous switching cycle and when an output current of the switching regulator is not being current limited.

* * * * *